(12) United States Patent
Hotter (10) Patent No.: US 9,106,816 B1
(45) Date of Patent: Aug. 11, 2015

(54) HANDHELD APPARATUS FOR DEMONSTRATING A SCREEN DISPLAY

(75) Inventor: Dennis L. Hotter, Shawnee, KS (US)

(73) Assignee: Sprint Communications Company L.P., Overland Park, KS (US)

(*) Notice: Subject to any disclaimer, the term of this patent is extended or adjusted under 35 U.S.C. 154(b) by 202 days.

(21) Appl. No.: 13/348,776

(22) Filed: Jan. 12, 2012

(51) Int. Cl.
*H04N 5/225* (2006.01)
*H04N 5/222* (2006.01)
*H04N 5/232* (2006.01)

(52) U.S. Cl.
CPC .......... *H04N 5/2252* (2013.01); *H04N 5/23293* (2013.01)

(58) Field of Classification Search
CPC . H04N 5/2251; H04N 5/2252; H04N 5/2253; H04N 5/2254; H04N 5/23293
USPC .......................... 348/333.01–333.12, 373–376
See application file for complete search history.

(56) References Cited

U.S. PATENT DOCUMENTS

| | | | | |
|---|---|---|---|---|
| 5,612,756 | A * | 3/1997 | Kardach | 396/422 |
| 8,137,008 | B1 * | 3/2012 | Mallano | 396/427 |
| 2001/0048585 | A1 * | 12/2001 | Imsand | 361/681 |
| 2009/0114786 | A1 * | 5/2009 | Meyer et al. | 248/222.51 |
| 2009/0115835 | A1 * | 5/2009 | Shaffer et al. | 348/14.08 |
| 2010/0045943 | A1 * | 2/2010 | Gillespie | 353/79 |
| 2010/0208070 | A2 * | 8/2010 | Haynes et al. | 348/148 |
| 2010/0313462 | A1 * | 12/2010 | Holmberg | 42/124 |
| 2011/0263299 | A1 * | 10/2011 | Kotani | 455/566 |
| 2012/0019641 | A1 * | 1/2012 | Reeder, III | 348/61 |
| 2012/0285061 | A1 * | 11/2012 | Angon | 40/798 |

OTHER PUBLICATIONS

Filmtools, Zacuto Zgrip iPhone Jr. Z-ZG-IPJ, http://www.filmtools.com/iphone-zgrip-jr-zacuto-z-zg-ipj.html, retrieved Feb. 11, 2011, 1 page.

* cited by examiner

*Primary Examiner* — Sinh Tran
*Assistant Examiner* — Xi Wang (57) ABSTRACT

An apparatus is described for demonstrating a screen display of a device. The apparatus includes a base member to which a camera mount and a device mount are coupled at opposite ends thereof. A handle is coupled to a side opposite that of the camera and device mounts and centrally along the length of the base member. The handle includes a passage within which a camera cable is retained. The device mount includes a mounting bracket at a distal end that magnetically couples to a clip attached to a device to be demonstrated. The clip is coupleable to the mounting bracket in a plurality of rotational orientations. The apparatus rigidly maintains the orientation of the device and camera while a user caries and moves the apparatus during demonstration of the device. An image/video of the device's screen display is optically captured and presented to an audience.

20 Claims, 5 Drawing Sheets

FIG. 1.

HANDHELD APPARATUS FOR DEMONSTRATING A SCREEN DISPLAY

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter. In brief and at a high level, this disclosure describes, among other things, a handheld apparatus for demonstration of a device's screen display to an audience. The apparatus includes a base member having a device mount located at a first end and a camera mount located at an opposite second end thereof. The device mount being adjustable to retain a device, such as a mobile phone, a tablet device, or the like, and to properly locate the device within the field of view of a camera mounted in the camera mount. The apparatus also includes a handle coupled to the base member.

The apparatus is thus useable by a presenter to capture an image of a display screen of a device mounted in the device mount. The captured image can be presented to an audience of one or more people via one or more monitors that display the captured image. The apparatus is also preferably of a lightweight and user-friendly construction that enables the presenter to easily carry and use the apparatus during demonstration of the device mounted therein.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components or combinations of components similar to the ones described in this document, in conjunction with other present or future technologies. Terms should not be interpreted as implying any particular order among or between various steps herein disclosed unless and except when the order of individual steps is explicitly described.

Further, components of the apparatus described herein can be manufactured by any desired methods and from any desired materials. For example, components might be machined, injection molded, cast, or combinations thereof from a plastic, metal, composite material or the like. Exemplary methods and materials described herein are intended to aid description of embodiments of the invention and are not intended to limit such.

With reference now to FIGS. 1-10, a screen-display-demonstration apparatus 10 is described in accordance with an embodiment of the invention. The apparatus 10 includes a base member 12, a camera mount 14, a device mount 16, and a handle 18. The base member 12 comprises an elongate body 20 having a first end 22 and a second end 24. The first end 22 of the base member 12 is configured to couple to the camera mount 14. In an embodiment, an aperture 26 is disposed near the first end 22 of the base member 12 to receive a coupling feature of the camera mount 14. The aperture 26 might comprise a slot extending along and parallel to the length of the base member 12 to enable adjustment of a mounting position of the camera mount 14 along the length of the base member 12. In another embodiment, the camera mount 14 is integral with the first end of the base member 12.

The second end 24 of the base member 12 is configured to couple to the device mount 16. In an embodiment, an aperture 28 is provided near the second end 24 to receive a coupling feature of the device mount 16. The aperture 28 might comprise a slot extending generally perpendicular to the length of the base member 12 to enable side-to-side adjustment of the device mount 16 with respect to the base member 12. In another embodiment, the aperture 28 extends in any of a variety of directions to enable adjustment of the mounting position of the device mount 16 with respect to the base member 12. The second end 24 might also be of greater width than the remainder of the base member 12 to increase the size of the aperture 28 and thus the positional adjustability of the device mount 16.

A central portion 30 of the base member 12 is configured to couple to the handle 18. In an embodiment, one or more apertures 32 are provided in the central portion 30 to enable coupling of the handle 18 to the base member 12. The apertures 32 might also enable adjustment of the position of the handle 18 along the length of the base member 12. In an embodiment, the handle 18 is integral with the base member 12.

Although apertures 26, 28, and 32 are described for coupling the camera mount 14, the device mount 16, and the handle 18 to the base member 12, it is recognized that other methods and features are available by which such couplings and adjustability might be achieved. For example, the base member 18 might include one or more rails or tracks along which a mating feature of the camera mount 14, device mount 16, and/or handle 18 might slide. Or other features like snap-fittings, friction fittings, or quick-release fittings might be employed. Such methods and features are understood as falling within the scope of embodiments of the invention and are not describe further herein to avoid obscuring this description of embodiments of the invention.

The camera mount 14 includes a body 34, a first end 36 configured to couple to the base member 12, and a second end 38 configured to couple to a camera 40. The body 34 is of a size and dimensions sufficient to support the camera 40 in a position suitable to enable the camera 40 to capture an image of a device 42 mounted on the device mount 16 as described below. In an embodiment, the body 34 comprises a cylindrical standoff of sufficient length to position the camera 40 at a distance from the base member 12 that is approximately equal to the center of the device 42 when mounted in the device mount 16. In an embodiment, a plurality of camera mounts 14 might be provided for use with the apparatus 10 for demonstrating devices 42 of a variety of sizes and configurations. In another embodiment, the camera mount 14 has an adjustable length.

The first end 36 of the camera mount 14 includes a threaded recess (not shown) for threadably receiving a stud 44 with an enlarged end. The stud 44 is inserted through the aperture 26 of the base member 12 and into the camera mount 14. The stud 44 can be tightened to rigidly maintain the position of the camera mount 14 in the aperture 26 or can be loosened to enable adjustment of the position.

The second end 38 of the camera mount 14 includes a threaded stud (not shown) or other feature that enables coupling to the camera 40. In an embodiment, the camera 40 includes a threaded recess that allows the camera 40 to be threadably coupled to the camera mount 14.

The camera 40 depicted in FIGS. 1-6 and 8 is a lipstick-style, high-definition camera, such as a model HD-RH1 video camera from Iconix of Santa Barbara, Calif. However, any video or still camera product or technology is useable in embodiments of the invention. The camera 40 is also depicted as employing hardwire communications, e.g. a cable, but wireless technologies might be used. In an embodiment, the camera might also include or be associated with one or more microphones or sound capturing devices configured to capture sounds produced by the device 42. In another embodiment, a separate microphone is mounted on the apparatus 10, such as along the base member 12.

Figure 1:
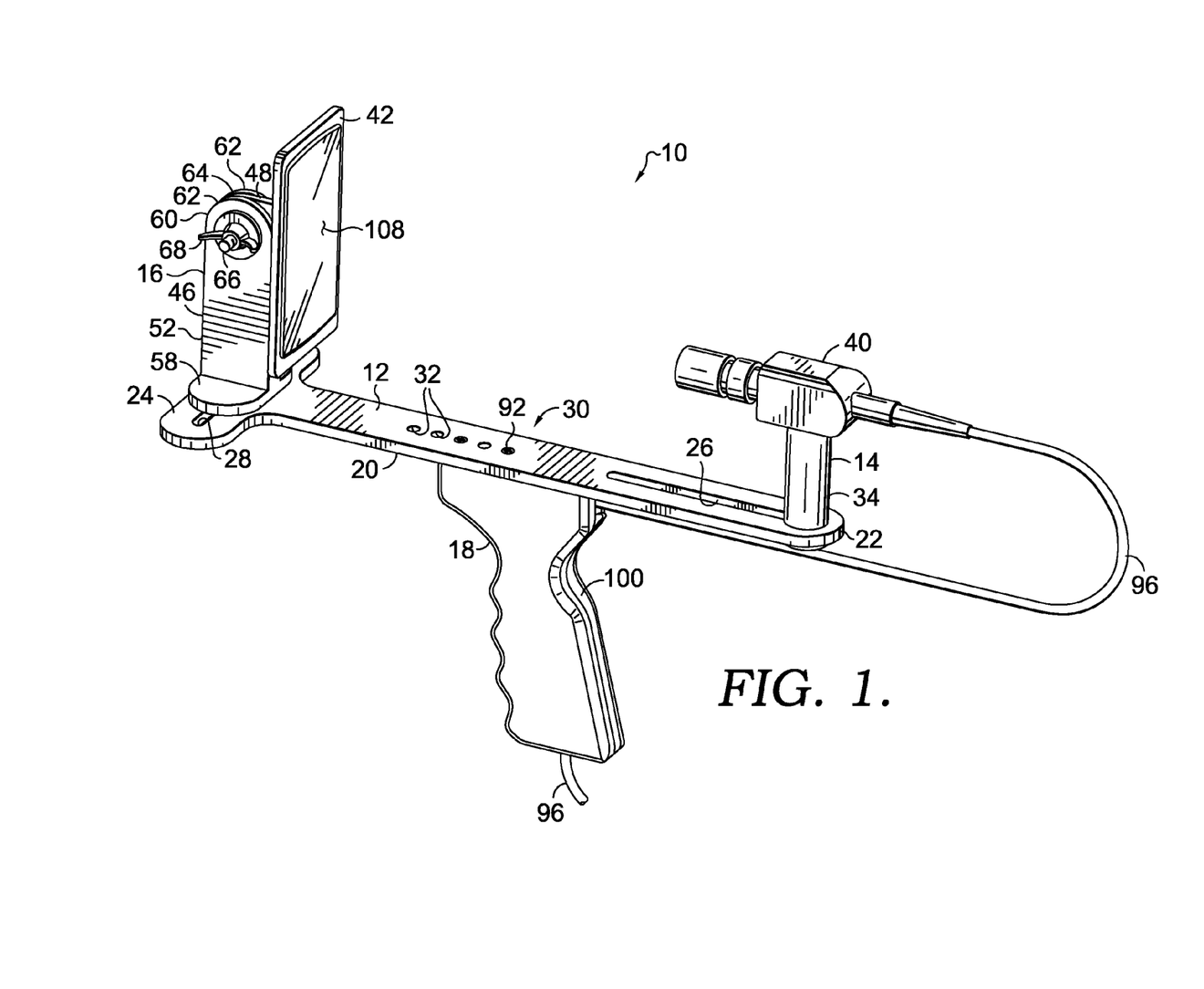
FIG. 1 is a side perspective view of an apparatus for demonstrating a screen display of a device in accordance with an embodiment of the invention.
Figures 2, 3:
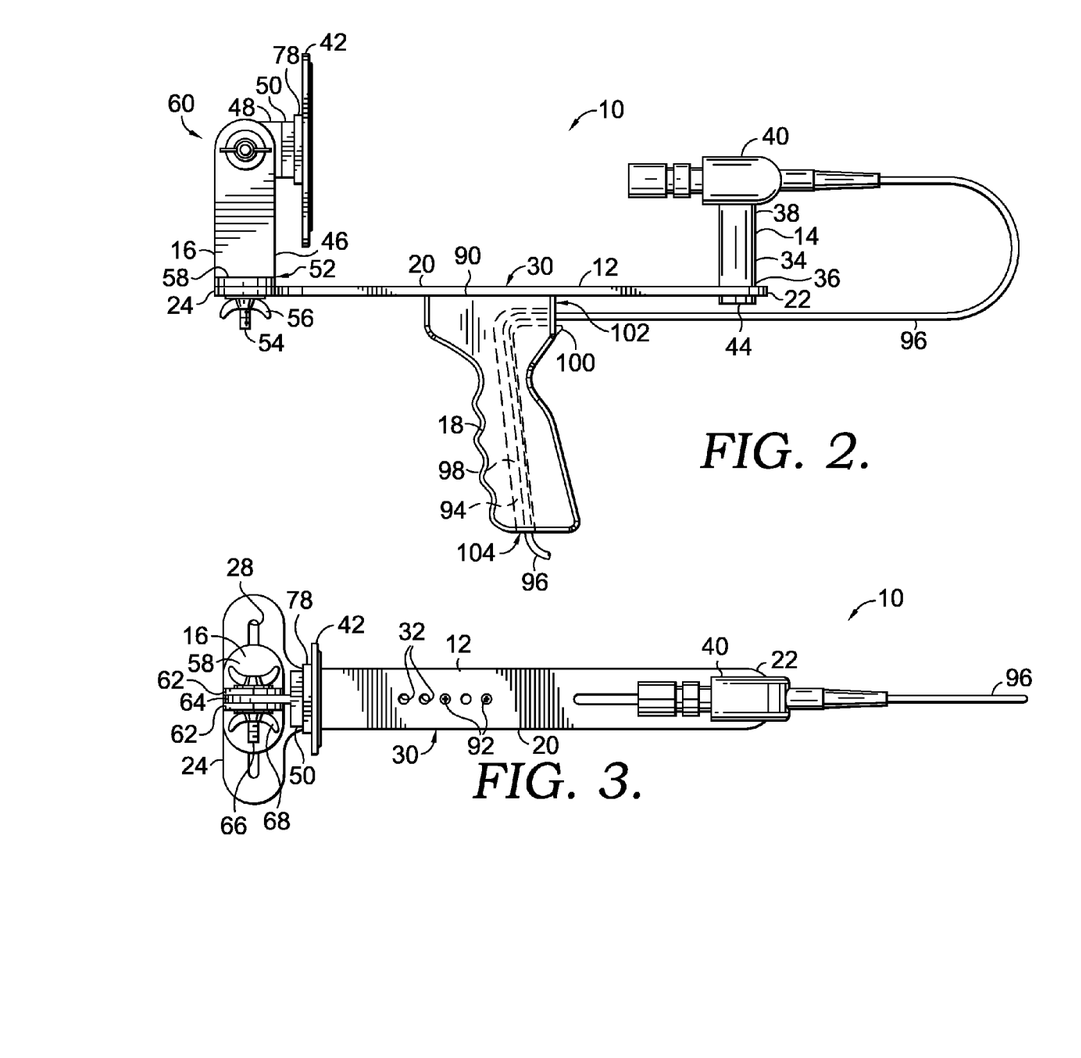
FIG. 2 is a side elevational view of the apparatus depicted in FIG. 1.
FIG. 3 is a top plan view of the apparatus depicted in FIG. 1.
Figure 4:
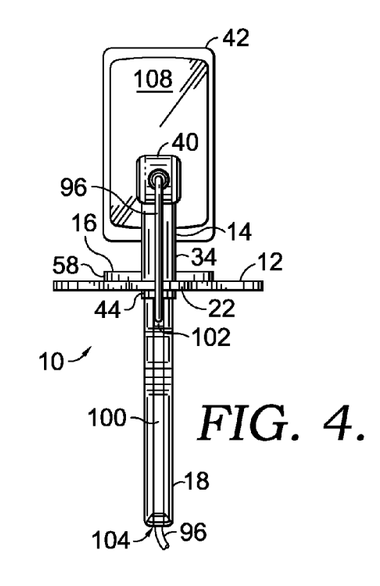
FIG. 4 is an elevational view from a camera-mount end of the apparatus depicted in FIG. 1.
Figures 5, 7:
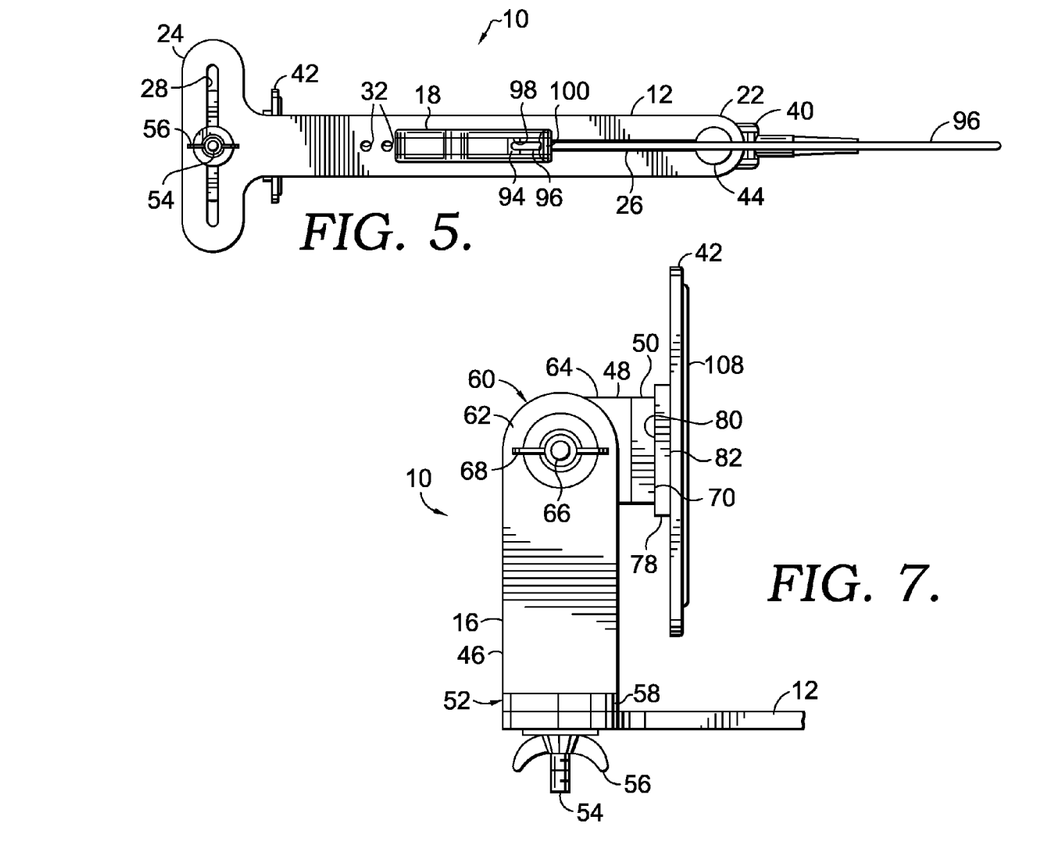
FIG. 5 is a bottom plan view of the apparatus depicted in FIG. 1.
FIG. 7 is an elevational side-view of the device-mount end of the apparatus depicted in FIG. 1.
Figure 6:
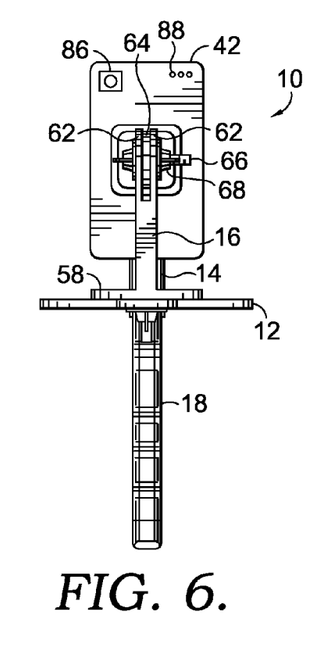
FIG. 6 is an elevational view of from a device-mount end of the apparatus depicted in FIG. 1.
Figures 8, 9:
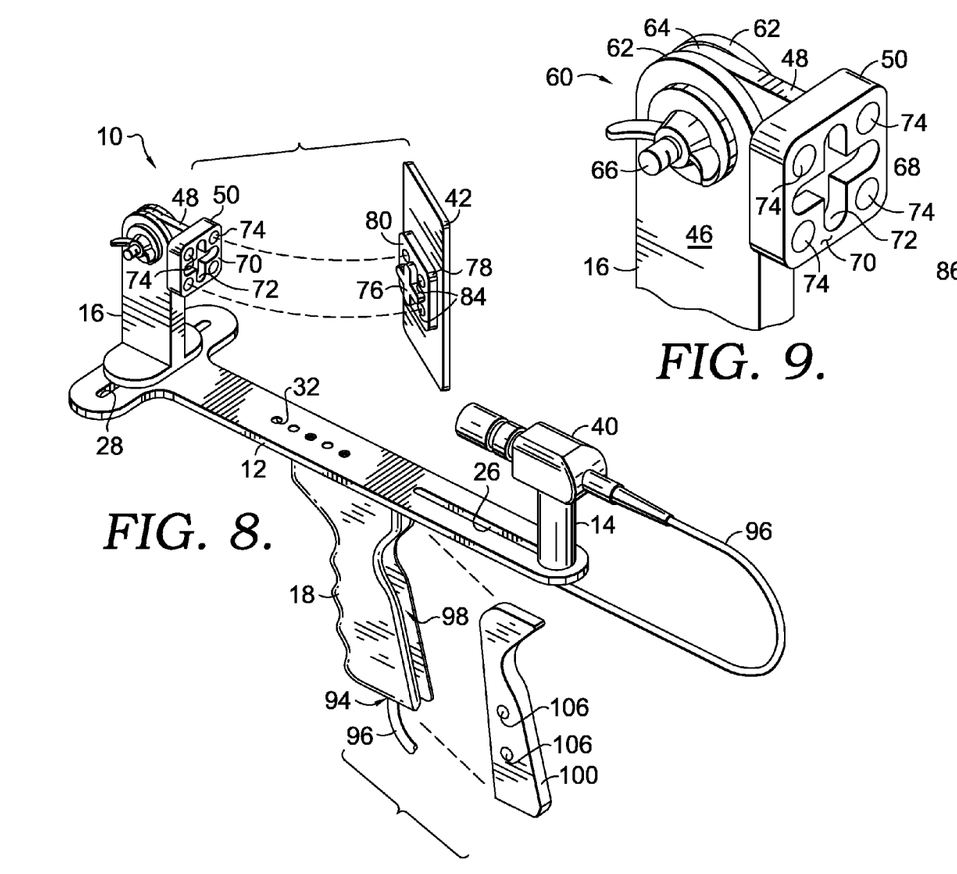
FIG. 8 is a side perspective view of the apparatus depicted in FIG. 1 showing a device and clip detached from the device mount in accordance with an embodiment of the invention.
FIG. 9 is a perspective view of the device mount of the apparatus depicted in FIG. 1 with the device and clip detached in accordance with an embodiment of the invention.

As best depicted in FIGS. 7-9, the device mount 16 comprises a body 46, a mounting arm 48, and a mounting bracket 50. A first end 52 of the body 46 is configured to couple to the base member 12, such as via a threaded stud 54 that is disposed through the aperture 28 and threadably coupled to a wing-nut 56 or other similar configurations. The first end 52 might also include a portion 58 of increased dimensions over that of the remainder of the body 46 to provide additional stability or support for the device mount 16. In an embodiment, multiple device mounts 16 can be coupled to the apparatus 10 simultaneously to enable multiple devices 42 to be mounted on the apparatus 10 at one time. Or the device mount 16 might be configured to receive more than one device 42 at a time.

A second end 60 of the body 46 of the device mount 16 is configured to pivotably couple to the mounting arm 48. In an embodiment, the second end 60 includes a pair of parallel flanges 62 extending from the second end 60 between which a tang 64 on the mounting arm 48 is inserted in a manner similar to a clevis and tang. A bolt 66 or other fastener is inserted through the flanges 62 and tang 64 and threadably coupled to a nut 68 to pinch the tang 64 between the flanges 62. The pinching of the tang 64 provides friction between the tang 64 and the flanges 62 to maintain the position of mounting arm 48 with respect to the body 46. It is understood that a variety of similar configurations are known in the art to accomplish a similar purpose—such configurations are understood as falling within the scope of embodiments of the invention described herein. For example, a plurality of radial ribs might be provided on the mating faces of the flanges 62 and the tang 64 to provide rigid, step-wise positioning or a form of ball-and-socket coupling or gimbal mount might be employed.

In an embodiment, the device mount 16 is extendable in length such that the second end 60, and thus, the bracket 50 can be provided at a variety of distances from the base member 12. In another embodiment, a plurality of device mounts 16 are provided, each having a different length and being selectable to provide the second end 60 at a desired distance from the base member 12. The orientation of the mounting arm 48 with respect to the body 46 might also provide similar adjustability.

With continued reference to FIGS. 8 and 9, the mounting bracket 50 is disposed opposite the tang 64 on the mounting arm 48. The mounting bracket 50 provides a first mating surface 70 with one or more recesses 72 and one or more magnets 74 disposed therein. The recess 72 is configured to accept a mating protuberance 76 on a clip 78 coupled to the device 42. Interaction of the recess 72 and protuberance 76 prevent rotational and lateral movement in the plane of the mounting surface 70. In an embodiment, the recess 72 and protuberance 76 have a cross pattern, but any desired pattern might be used. In another embodiment, the recess 72 and protuberance 76 can be aligned in a plurality of orientations. For example, when using a cross pattern the recess 72 and protuberance 76 can be coupled in two different orientations that are rotated 90° from one another. Or, when using, for example, a star pattern, the recess 72 and protuberance 76 might be oriented in any number of rotationally different positions.

Figure 10:
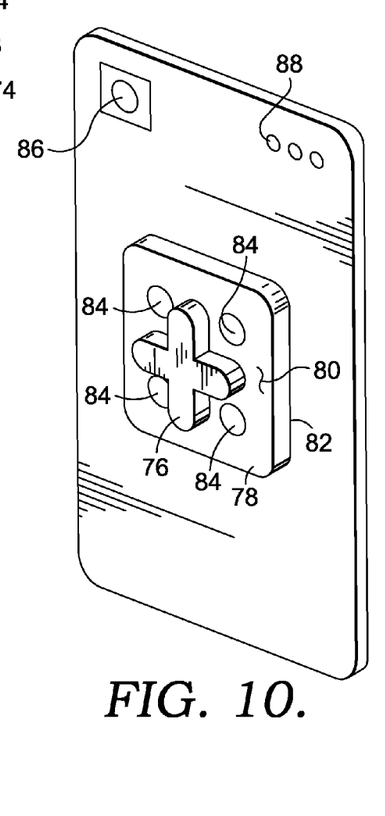
FIG. 10 is a perspective view of a device having a clip affixed thereto in accordance with an embodiment of the invention.

The clip 78, as best shown in FIG. 10, includes a second mating surface 80 and a mounting surface 82. The second mating surface 80 includes the protuberance 76 and one or more magnets 84. The one or more magnets 84 are disposed within the clip 78 such that they align with mating magnets 74 in the mounting bracket 50 to magnetically couple the clip 78 to the mounting bracket 50. In another embodiment, one or more clips, snap-fit fittings, friction-fit fittings or other features are employed instead of or in addition to the magnets 74 and 84 to couple the clip 78 to the bracket 50.

The mounting surface 82 of the clip 78 is configured to be coupled to the device 42. The mounting surface 82 may include one or more features to aid in coupling to the device 42, such as for example and not limitation, double sided tape, an adhesive, a glue, a reusable adhesive layer, suction cups, magnets, clips, arms, or the like. The mounting surface 82 is a flat surface. Or the mounting surface 82 is contoured to the shape of a device 42 to be mounted thereon or to accommodate the coupling features described above. In an embodiment, the clip 78 is configured to couple to multiple devices 42 simultaneously to enable the multiple devices to be mounted on the apparatus 10 at one time.

The clip 78 is configured to not interfere with features of the device 42 that is coupled thereto. For example, the clip 78 is configured so as not to obscure a camera lens 86, sensor 88, or other features like switches or buttons on the device 42. In an embodiment, a plurality of clips 78 is provided to enable interchangeability between a number of devices 42 on the apparatus 10.

The handle 18 is configured to couple to the base member 12 along the central portion 30 thereof and to a side opposite that of the camera mount 14 and the device mount 16. In an embodiment, the handle 18 includes a pair of threaded recesses (not shown) in an upper surface 90 into which a pair of fasteners 92 can be inserted to couple the handle 18 to the base member 12. The handle 18 can be of any desired configuration and in some embodiments is of a pistol-grip-type configuration.

The handle 18 includes a passage 94 through which a cable 96 for the camera 40 is routed. As best depicted in FIG. 8, in an embodiment, the passage 94 is formed by a channel 98 in the handle 18 and an insert 100 disposed in the channel 98. The insert 100 is slideably removable from the channel 98 and is configured to provide an entrance 102 and an exit 104 from the passage 94 for the cable 96. The insert 100 may be retained in the channel 98 by friction fit and/or may include one or more features, such as magnets, clips, tabs, or the like. In an embodiment, the insert 100 includes a pair of magnets 106 that magnetically couple to a pair of magnets (not shown) disposed in a corresponding surface of the channel 98.

With continued reference to FIGS. 1-10, the assembly and operation of the apparatus 10 is described in accordance with an embodiment of the invention. Initially, the camera mount 14, device mount 16, and handle 18 are coupled to the base member 12. In an embodiment, the couplings may be made snug, but not tightened to allow ease of adjustment upon full assembly. The camera 40 is coupled to the camera mount 14 using a threaded stud and is directed toward the device mount 16. The insert 100 is removed from the channel 98 of the handle 18 and the camera cable 96 is inserted into the channel 98. The insert 100 is re-inserted into the channel 98 to capture the cable 96 therein.

The clip 78 is affixed to the device 42 that is to be demonstrated using double-sided tape or other adhesive placed on the mounting surface 82 of the clip 78. The device 42 comprises any device having a screen display that is to be captured by the camera 40. The device 42 might be, for example and not limitation, a mobile device, a tablet computer, a laptop computer, a personal data assistant (PDA), a mobile phone, a mobile/portable gaming device, or the like. In another embodiment, the device 42 includes any object of which an image is to be captured. Such objects might include a watch, jewelry, a toy, collectibles, a tool, or the like.

The clip 78 is positioned on the back side of the device such that it does not interfere or obscure any camera lenses 86 or sensors 88 on the device 42. The clip 78 is also oriented to provide a desired orientation of the device 42 when the clip is coupled to the device mount 16. For example, the clip 42 is oriented such that the device 42 will be held in a portrait or landscape orientation when coupled to the mounting device 16. The device 42 with the clip 78 affixed thereto is coupled to the device mount 16 by inserting the protuberance 76 of the clip 78 into the recess 72 and allowing the magnets 74, 84 to couple together.

The apparatus 10 may be adjusted to provide desired positioning of the various components thereon. The mounting arm 48 is pivotally adjusted about the second end 60 of the device mount 16 to place the device 42 in a desired position. The device mount 16 is adjusted with respect to the base member 12 as desired. The camera mount 14 may also be adjusted along the length of the base member 12. And the handle 18 can be adjusted along the length of the base member 12 to provide a desired weight distribution with respect to the handle 18 for ease in handling. The adjustments preferably place the camera 40 and a display surface 108 of the device 42 in a suitable orientation to capture an image or video of a display produced on the display surface 108. The various adjustments are retained by tightening their couplings to generally rigidly retain the orientation of the device 42 with respect to the camera 40.

Figure 11:
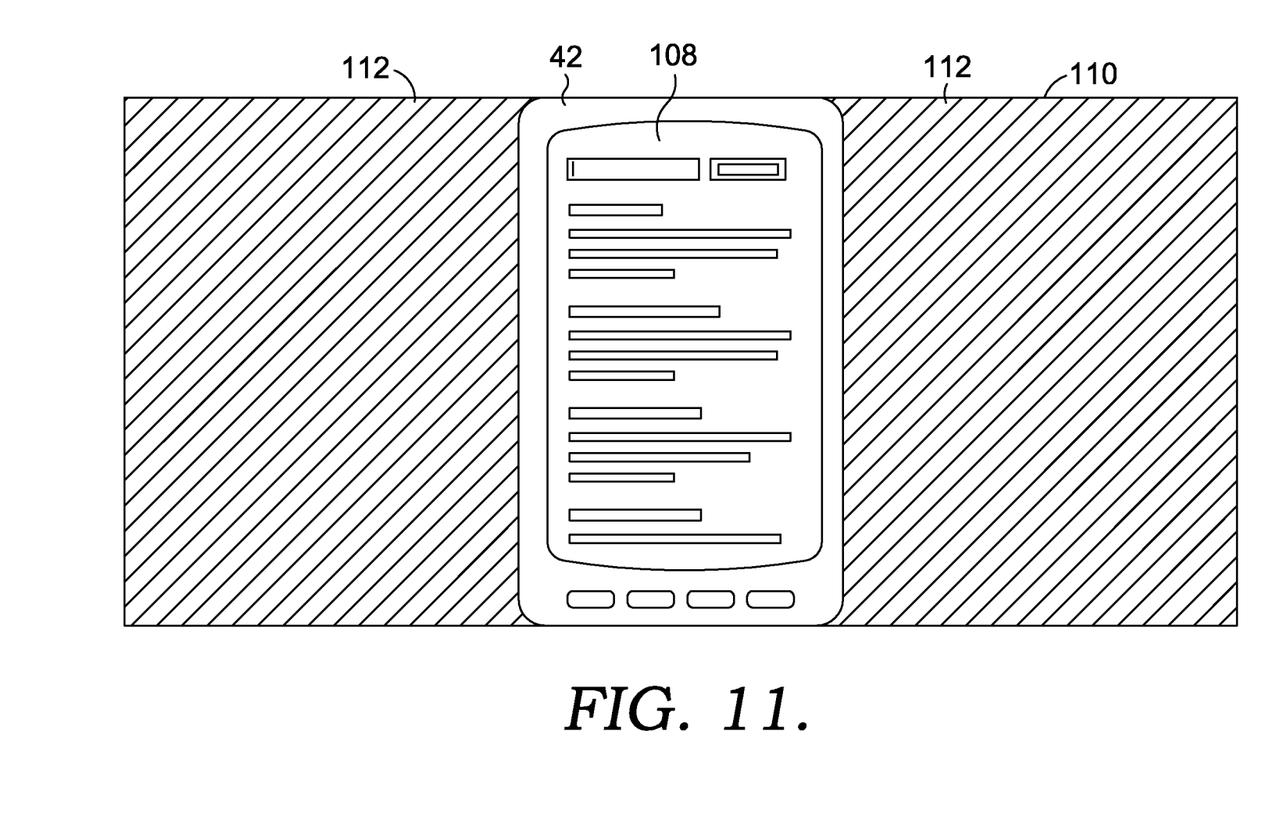
FIG. 11 is graphical representation of an exemplary image captured by a camera of an apparatus for demonstrating a screen display of a device in accordance with an embodiment of the invention.

A user can thus use the apparatus 10 to demonstrate the device 42 and present the display produced on the display surface 108. The user grasps the handle 18 in one hand while using their other hand to interact with the device 42. The apparatus 10 retains the orientation of the camera 40 and the device 42 while the user can move around a stage or room carrying the apparatus 10. The camera 40 captures an image 110 or video of the display surface 108 in which the position of the display surface 108 remains static while the user moves about the stage/room, as depicted in FIG. 11. The image 110 or video can be recorded and/or presented on one or more associated monitors, projection screens, or the like to an audience of one or a plurality of people.

Various visual effects or alterations may be applied to the image/video 110 captured by the camera 40 before presentation to the audience. For example, portions 112 of the image/video 110 might be blacked out (as depicted by shading in FIG. 11) or enhanced to increase visibility of the display surface 108. In an embodiment, portions 112 of the field of view of the image/video 110 captured by the camera 40 that lie outside the display surface 108 are blacked out. Such might allow viewers to more easily concentrate or have their attention drawn to the display surface 108 being demonstrated. Blacking out these portions 112 might also relieve any disorientation or motion-sickness-type effects that might be felt by viewers if they were to view a constantly moving image adjacent to the display surface 108.

In an embodiment, a hood or shield (not shown) is provided to reduce glare on the display surface 108 of the device 42. The hood may be coupled to the device 42, the clip 78, the device mount 16, or to the apparatus 10 generally. The hood might project about the display surface 108 to shield the display surface 108 from environmental lighting such as spot lights commonly used on stages.

An exemplary implementation of the apparatus 10 is now described in accordance with embodiments of the invention. In this example, a new, touch-screen, smart phone device, such as the device 42, is to be unveiled to an audience in an auditorium for a product roll-out. The device 42 is coupled to the clip 78 and is placed on the device mount 16 in a portrait orientation. A presenter carries the apparatus 10 with the device 42 coupled thereto on stage and begins his/her presentation. With reference to FIG. 11, an image 110 of the display surface 108 or user interface generated by the device 42 on the display surface 108 thereof is optically captured by the camera 40. Portions 112 of the image 110 depicting background outside the display surface 108 of the device 42 are cropped, cut, or blacked out (as depicted by shading in FIG. 11) and the edited image 110 is presented on a plurality of monitors in the auditorium for the audience to view. As such, the device 42 is statically located within the image 110 presented to the audience even though the device 42 and camera 40 are being moved about by the presenter.

The presenter interacts with the device 42 and the image 110 of his/her interactions and the resulting display screens are presented to the audience. The configuration of the camera 40 and the device 42 allow the presenter to access and view the device 42 without being obstructed by the camera 40 or the apparatus 10. And when the presenter wishes to change the orientation of the device 42 to landscape, the device 42 is easily decoupled from the device mount 16, rotated approximately 90°, and re-coupled to the device mount 16 using the recess 72, protuberance 76, and magnets 74, 84. Similarly, the presenter may switch the device 42 with a second product to be demonstrated by decoupling the device 42 and replacing it with the second product that has a second clip affixed thereto. If necessary, adjustments to the orientation of the camera 40 and the second product may also be easily performed as described previously. In an embodiment, a plurality of devices is mounted on the apparatus 10 to allow side-by-side demonstration of the plurality of devices.

In an embodiment, the apparatus 10 is configured to be of a generally light-weight design. The components of the apparatus 10 may be manufactured from light weight materials, such as plastics, aluminum, composites, or the like. As such, user fatigue during demonstration of the product is reduced.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An apparatus comprising:
a base member having a first end and a second end, wherein the first end opposes the second end;
a camera mount coupled to the first end of the base member;
a device mount coupled to the second end of the base member and having a bracket at a distal end thereof, the bracket including one of a first recess and a first protuberance; and
a handle coupled to the base member, wherein the handle is adapted to fully support a camera coupled to the camera mount and a device coupled to the device mount, wherein the camera is configured to capture at least one image of the device, and wherein the apparatus is a handheld demonstration apparatus.

2. The apparatus of claim 1, further comprising:
a clip having a mounting surface and a mating surface, the mating surface including one of a second recess and a second protuberance.

3. The apparatus of claim 2, wherein the bracket includes the first recess and the clip includes the second protuberance, the second protuberance being configured to be received by the first recess, or the bracket includes the first protuberance and the clip includes the second recess, the first protuberance being configured to be received by the second recess, and interaction between the first recess and second protuberance or the first protuberance and the second recess obstruct rotational or lateral movement of the clip with respect to the bracket in the plane of the mating surface.

4. The apparatus of claim 2, wherein the bracket and the clip include one or more magnets that are configured to magnetically couple the clip to the bracket.

5. The apparatus of claim 2, wherein the first and second recesses and first and second protuberances comprise a cross pattern.

6. The apparatus of claim 1, wherein the handle includes a passageway configured to receive a camera cable.

7. The apparatus of claim 6, wherein the passageway is formed by a channel in the handle and an insert that is received within the channel.

8. The apparatus of claim 1, wherein a position of the camera mount is adjustable along the length of the base member.

9. The apparatus of claim 1, wherein a position of the device mount is adjustable side-to-side perpendicular to the length of the base member.

10. The apparatus of claim 1, wherein a position of the handle is adjustable along the length of the base member.

11. A handheld apparatus that maintains an orientation of a camera and a device for presentation of a screen display on the device to an audience, the apparatus comprising:
a base member having a first end and a second end and a length defined between the first and second ends, wherein the first end opposes the second end;
a camera mount coupled to the base member in a first position proximate to the first end of the base member, the first position being adjustable with respect to the base member;
a device mount coupled to the base member in a second position proximate to the second end of the base member, the second position being adjustable with respect to the base member;
a bracket at a distal end of the device mount, the bracket including a first coupling element and one or more of a first recess and a first protuberance;
a handle coupled to the base member, wherein the handle is adapted to fully support a camera coupled to the camera mount and a device coupled to the device mount, and wherein the camera is configured to capture at least one image of the device; and
a clip having a mounting surface and a mating surface, the mating surface including a second coupling element and one or more of a second recess and a second protuberance.

12. The apparatus of claim 11, wherein the bracket includes the first recess and the clip includes the second protuberance, the second protuberance being configured to be received by the first recess, or the bracket includes the first protuberance and the clip includes the second recess, the first protuberance being configured to be received by the second recess, and interaction between the first recess and second protuberance or the first protuberance and the second recess obstructs rotational or lateral movement of the clip with respect to the bracket in the plane of the mating surface.

13. The apparatus of claim 11, wherein the first and second recesses and first and second protuberances comprise a pattern that enables the clip to be coupled to the bracket in a plurality of rotational orientations.

14. The apparatus of claim 11, wherein the first and second coupling elements include one or more magnets that are configured to magnetically couple the clip to the bracket.

15. The apparatus of claim 11, wherein the handle includes a passageway configured to receive a camera cable.

16. The apparatus of claim 11, wherein a position of the handle is adjustable along the length of the base member.

17. The apparatus of claim 11, wherein the first position of the camera mount is adjustable along the length of the base member.

18. The apparatus of claim 11, wherein the second position of the device mount is adjustable at an angle to the length of the base member.

19. The apparatus of claim 11, wherein the device mount includes a pivotally adjustable mounting arm that includes the bracket at a distal end thereof.

20. A system that presents an optically captured image of a display screen on an electronic device to an audience, the system comprising:

a handheld demonstration apparatus that includes:
- a base member having a first end and a second end that opposes the first end,
- a camera mount coupled to the base member proximate to the first end of the base member,
- a camera coupled to a distal end of the camera mount,
- a device mount coupled to the base member proximate to the second end of the base member,
- a bracket at a distal end of the device mount, the bracket including one or more of a first recess and a first protuberance in a first mating surface,
- a clip having a mounting surface and a second mating surface, the second mating surface including one or more of a second recess and a second protuberance, and the clip being coupled to the bracket by one or more coupling features and the first recess mating with the second protuberance or the first protuberance mating with the second recess,
- an electronic device with a display screen, the device being affixed to the mounting surface of the clip, and
- a handle coupled to the base member, wherein the handle is adapted to fully support a camera coupled to the camera mount and a device coupled to the device mount, and wherein the camera is configured to capture at least one image of the device; and a plurality of monitors communicatively coupled to the camera and displaying an image captured by the camera of the display screen on the electronic device.

* * * * *